United States Patent [19]

Marcello et al.

[11] Patent Number: 5,890,812
[45] Date of Patent: Apr. 6, 1999

[54] ROLLING CONTACT BEARING SEALING DEVICE

[75] Inventors: Pinto Marcello, Turin; Visconti Alberto, Varese, both of Italy

[73] Assignee: SKF Industrie S.P.A., Turin, Italy

[21] Appl. No.: 681,282

[22] Filed: Jul. 22, 1996

[51] Int. Cl.[6] .............................. F16C 33/74; F16C 33/76; F16C 33/80
[52] U.S. Cl. .......................... 384/148; 384/151; 384/478; 384/480; 384/482
[58] Field of Search ...................... 384/478, 480, 384/482, 488, 147, 148, 149, 150, 151; 277/81 R, 95

[56] References Cited

U.S. PATENT DOCUMENTS

| | | | |
|---|---|---|---|
| 1,145,516 | 7/1915 | Schmid-Roost | 384/478 |
| 1,978,739 | 10/1934 | Brittain, Jr. | 384/478 |
| 3,510,138 | 5/1970 | Bowen et al. | 384/478 |
| 4,272,135 | 6/1981 | Hamblin et al. | 308/20 |
| 4,669,895 | 6/1987 | Colanzi et al. | 384/478 |
| 4,808,012 | 2/1989 | Otto | 384/482 |
| 4,848,776 | 7/1989 | Winckler | 384/478 |
| 5,015,001 | 5/1991 | Jay | 384/482 |
| 5,149,207 | 9/1992 | Vignoito | 384/478 |
| 5,292,199 | 3/1994 | Hosbach et al. | 384/478 |
| 5,487,611 | 1/1996 | Dreschmann et al. | 384/478 |

FOREIGN PATENT DOCUMENTS

| | | |
|---|---|---|
| 0 015 739 A1 | 9/1980 | European Pat. Off. . |
| 0 168 092 A2 | 1/1986 | European Pat. Off. . |
| 0 082 552 A1 | 6/1986 | European Pat. Off. . |
| 0 276 877 A3 | 8/1988 | European Pat. Off. . |
| 0388258 | 9/1990 | European Pat. Off. ............... 384/482 |
| 2631672 | 11/1989 | France .................................. 384/482 |
| 2228 757 | 2/1973 | Germany . |
| 3401706 | 8/1985 | Germany ............................... 384/482 |
| 0822085 | 10/1959 | United Kingdom ................... 384/480 |

Primary Examiner—Charles A. Marmor
Assistant Examiner—Matthew A. Kaness
Attorney, Agent, or Firm—Merchant, Gould Smith, Edell, Welter & Schmidt, P.A.

[57] ABSTRACT

A rolling bearing sealing device comprises a first, truncated-cone surface (21) integral with the non-rotating race (11) of the bearing and diverging axially towards the outside of the bearing, and a second truncated-cone surface (23) parallel to the first surface (21). The second surface is integral with the rotating race (16) of the bearing. The first and second surfaces (21, 23) are spaced apart and facing each other so as to determine therebetween a gap (25) of truncated-cone shape having a length (L) and a width (w) such to resist water entering in a chamber (26) communicating with the outside when the bearing is at rest, and expel water centrifuging it out of said chamber as the bearing rotates.

12 Claims, 2 Drawing Sheets

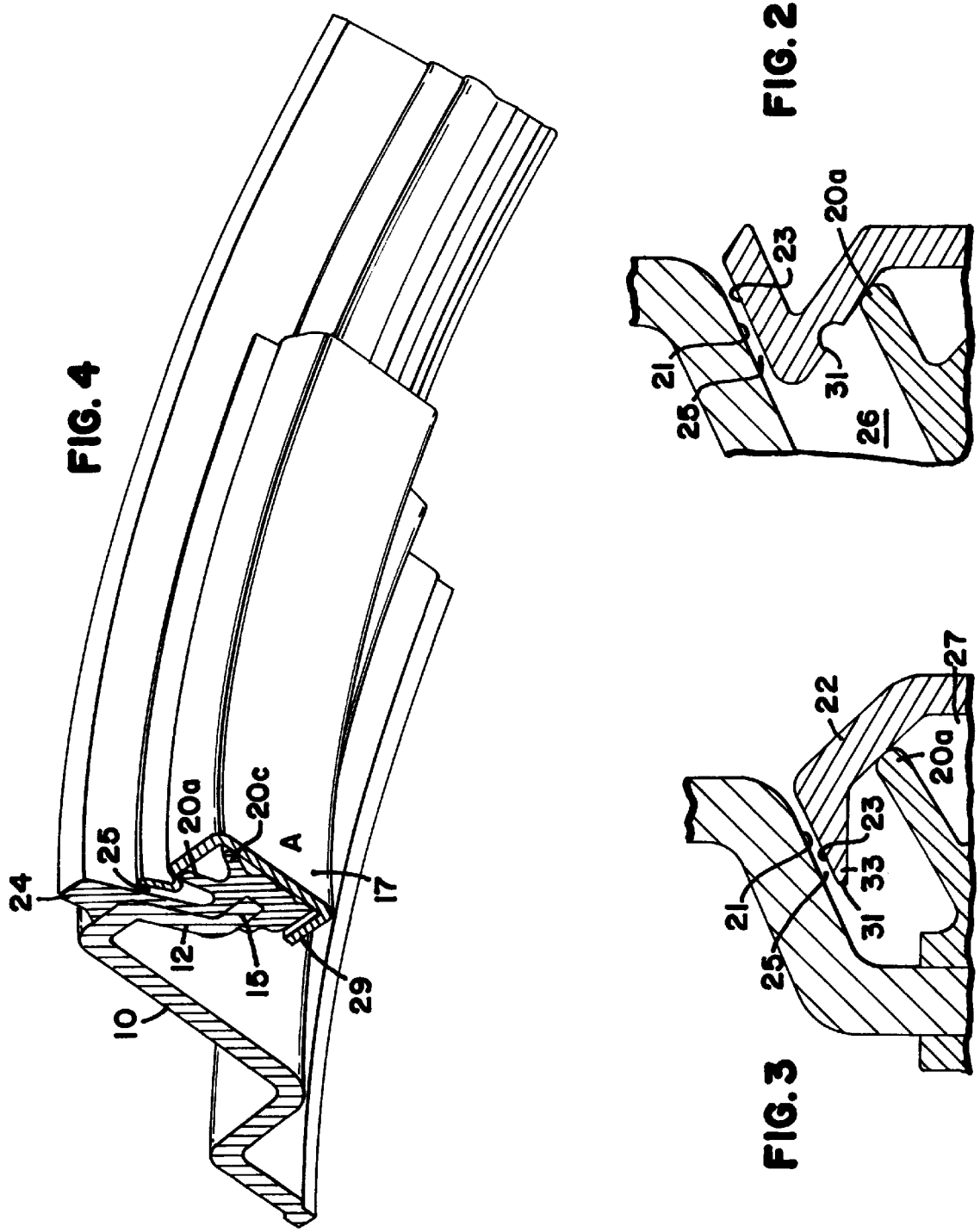

ROLLING CONTACT BEARING SEALING DEVICE

FIELD OF THE INVENTION

The present invention generally relates to the field of rolling contact bearings. In particular, the invention refers to a sealing device particularly well suited for cylindrical or tapered bearing units for application on railway vehicles.

BACKGROUND OF THE INVENTION

At present there are known sealing devices of the above type in which a rubber gasket being integral with one of the races of the bearing engages in sliding contact the outer cylindrical surface of a bush mounted to the other race of the bearing. The bush is subjected to grinding operations as well as thermal treatment to render said cylindrical surface smooth enough to ensure satisfactory sealing action and not wear out the gasket quickly. These accurate operations involve costs that make it desirable to have other alternative solutions.

Another limit with said known prior art is that this kind of sealing device is not able of providing simultaneously hermetic sealing and a sufficiently low frictional torque. As known, with bearings the greater part of energy consumption is due to the sealing devices. Further, owing to suction effects, while sealing devices are capable of preventing leak of lubricant from the bearing, they are not so efficient in preventing water or other contaminants from entering the bearing, and vice versa.

SUMMARY OF THE INVENTION

An object of the present invention is to provide a sealing device capable of overcoming the above discussed prior art inconveniences. It is desired to provide a sealing device performing excellent sealing action to water and other polluting agents (dust, dirt, etc.). Should these agents infiltrate in the first sealing stage, the desired sealing device should be able to expel them automatically before they can overcome the whole sealing device.

Another object of the invention is to arrange a sealing device capable of providing hermetic sealing action with a low contact pressure not increasing energy consumption nor causing quick wear of the sealing gasket.

A further object of the invention is to provide a device which does not hinder the discharge of air overpressure within a bearing.

A still further object is to provide a device which is interchangeable with conventional ones.

These and further objects which will be more apparent hereinafter are attained according to the present invention by the provision of a rolling bearing sealing device, characterized in comprising a first, substantially truncated-cone surface integral with the non-rotating race of the bearing and diverging axially towards the outside of the bearing, and a second truncated-cone surface substantially parallel to said first surface, said second surface being integral with the rotating race of the bearing, said first and second surfaces being spaced apart and facing each other so as to determine therebetween a gap of substantially truncated-cone shape having a length and a width such to resist water entering in a chamber communicating with the outside when the bearing is at rest, and expel water centrifuging it out of said chamber when the bearing rotates.

BRIEF DESCRIPTION OF THE DRAWINGS

For a better understanding of the present invention, reference is made to the following detailed description of various exemplary embodiments considered in combination with the accompanying drawings in which:

FIGS. 2 and 3 are two axial sectional views of two further alternative embodiments of the device of FIG. 1, respectively; and FIG. 4 is a perspective view of a sealing device according to this invention.

DETAILED DESCRIPTION OF THE INVENTION

Figure 1:
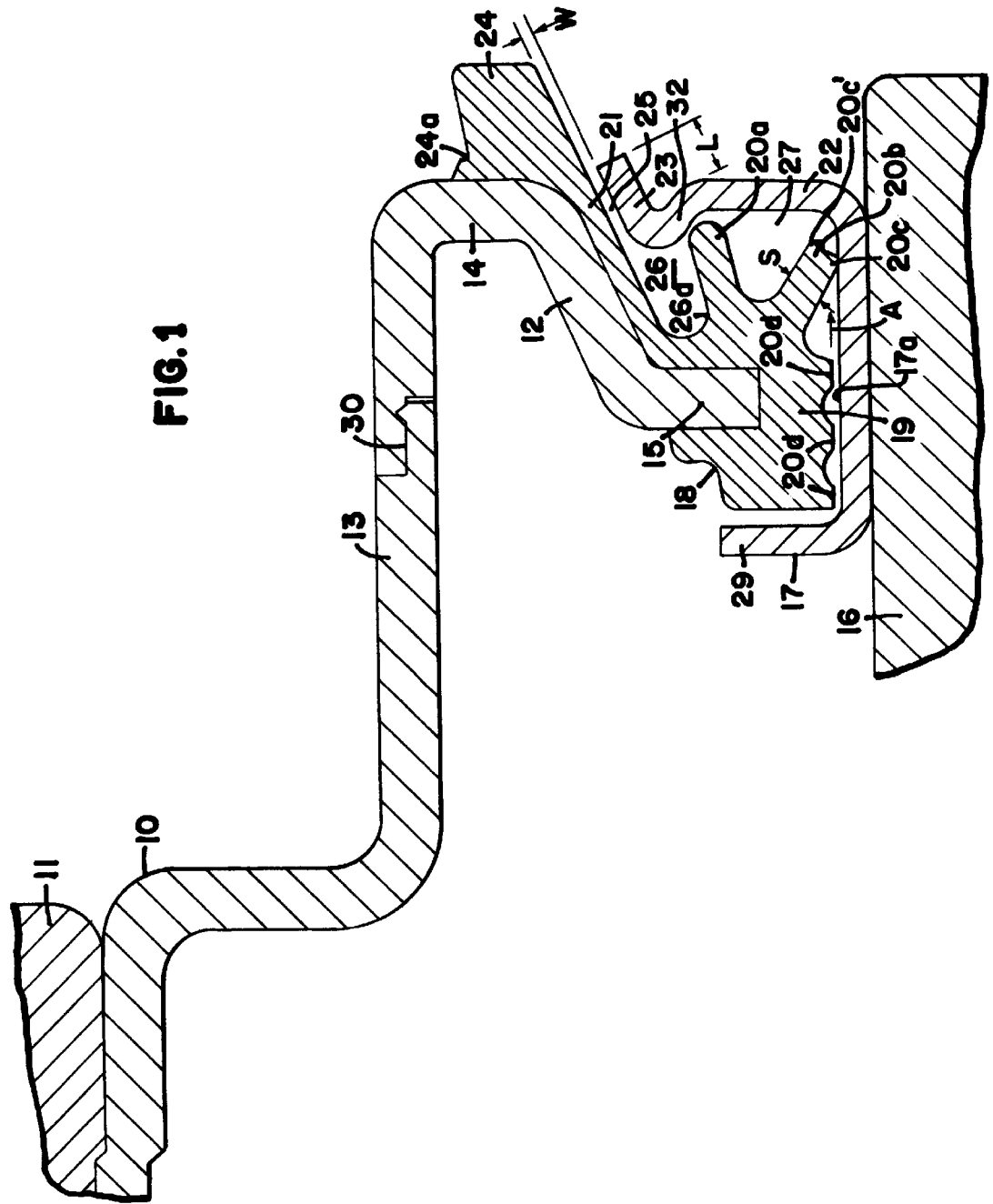
FIG. 1 is a schematic axial section view of a device in accordance with the present invention.

With reference initially to FIG. 1, numeral 10 designates a metal annular insert fixed to the non rotating outer race 11 of a tapered or cylindrical rolling bearing unit, such as those for use with railway axles.

The outer wall of insert 10 in the axial direction, i.e. to the right in FIG. 1, forms a flange portion 12 with a truncated cone shape diverging axially towards the outside. Flange portion 12 is jointed to a cylindrical axially extended portion 13 of the insert by a short flat radial portion 14 and ends with a substantially flat end portion 15 projecting towards the rotating inner race 16 of the bearing.

Fixed to the inner race 16 is a metal shield 17, the cross section of which is substantially shaped as a channel open in the direction of the end portion 15 of non rotating insert 10.

To the free end portion of insert 10, and more particularly to portions 12, 15 and 14 there is vulcanized a rubber gasket body 18 cooperating with shield 17 to seal hermetically the inner parts of the bearing with respect to water and other external polluting agents, and to prevent lubricant inside the bearing from leaking out.

Three portions are distinguished in the sealing gasket: an inner portion 19 wider in cross section, provided with a plurality of lips 20a–20d; a truncated cone surface portion 21 which covers the outside of the truncated cone flange portion 12 of insert 10; and, optionally, an axially protruding outer lip 24. The metal shield 17 forms an axially outer flange 22 which is suitably shaped to provide a truncated cone end wall or portion 23 parallel to and facing the truncated cone portion 21 of the sealing gasket.

According to the present invention, the truncated cone portions 21 and 23, having two parallel surfaces which determine therebetween a narrow gap 25 with a uniform width w, are disposed as a truncated cone diverging axially towards the outside. The length, width and angle of gap 25 are so dimensioned as to resist water from entering from the outside in stationary conditions, while allowing the centrifugal forces to expel water and other polluting agents, if any, when the bearing is rotating. Particularly, as shown in FIG. 1, the truncated cone portions 21 and 23 face each other over a length L with the width w such that water has difficulty in penetrating the gap 25 also in the event of pressurized water sprayed sideways, as is done periodically to clean railway vehicles. In the event of water entering chamber 26 anyway, it is however expelled by flowing in the channel 26a bounded by lip 20a. This slightly outwardly diverging lip acts as a circumferential gutter which collects the water in its bottom part (not shown) where gap 25 is inclined downwards and outwards. Lip 20a so prevents water from entering the inside of the bearing.

Preferably, the spacing w separating the facing surfaces of truncated-cone portions 21 and 23 is about 0.6 mm.

The outer lip 24 constitutes a first barrier to water infiltration as it covers the opening of gap 25 and also forms an outer, circumferential channel 24a for water drainage.

With the sealing device of the present invention the only contacting lip is the second lip 20b. Optionally, the end portion of lip 20b contacting the shield 17 can be provided with an insert 20c in self-lubricating and low-friction material, for example Teflon™. The lip 20b is bifurcated and has the first contacting tip 20c sliding on a cylindrical surface 17a of the shield 17 and a second, non-contacting tip 20c'. The inner part 19 having an enlarged cross section further forms other lips 20d providing labyrinth seal with shield 17. Preferably, shield 17 forms an axially inner radial flange 29 extending in the direction of insert 10.

The chamber 27 bounded between the non-contacting lip 20a and sliding lip 20b is filled with lubricant grease having water-repellent properties. Leakage of such grease is prevented by lip 20a. Advantageously, the contacting lip 20b converges towards the rotation axis of the bearing, thereby forming with the cylindrical surface 17a of shield 17 an acute angle of less than 45°. Preferably, said angle will range between 30° and 35° so as to allow only the discharge of overpressure possibly forming inside the bearing. In fact, when the cold bearing starts to rotate, heat develops and increases the pressure of the air within the inner parts of the bearing. An outwardly directed hydrodynamic flux (FIG. 1, arrow A) tends to form along the cylindrical surface 17a of shield 17. As a result, lip 20b raises somewhat to allow discharge of air overpressure. Inclination of lip 20b is such that the flux may take place only from the inside of the bearing towards the outside, and not vice versa. Owing to this provision, grease which may possibly be contaminated cannot return into chamber 27 and damage the rolling members within the bearing. In steady state there is no pressure gradient, whereby lip 20b engages shield 17 in low pressure contact in the illustrated arrangement. However, the thickness s of sliding lip 20b is such that it provides the stiffness required to prevent the vacuum forming within the bearing when cooling down from squashing the lip against the surface 17a. This suction effect has adverse results, as it causes the lip to adhere to the shield. Separation of these two members so becomes difficult and causes the lip to wear out rather rapidly.

As will be apparent, the provision of only one sliding surface allows to attain a very low resisting frictional torque, with low operating costs.

Due to the inclined arrangement, portions 21 and 23 can be near, thereby resisting water penetration. The width w of gap 25 can be less than the axial play allowed for insert 10. As stated, the ideal width is w=0.6 mm, while the normal axial play of inserts 10 is generally of about 0.7 mm.

Still with reference to FIG. 1, the metal insert 10 can advantageously be decomposable by providing a fixed junction 30, preferably of snap action kind. Such junction is located proximate to the end portion of the metal insert and serves to adapt the same sealing device to bearings having various axial sizes, changing only the cylindrical portion 13 with one having the appropriate length.

With reference to FIG. 2, an alternative embodiment of the sealing device according to the present invention provides for a drip 31 in the axially outer flange 22 of shield 17. The drip 31 is obtained in a portion 32 axially converging towards the outside of the bearing, at a radially outer and axially inner location relative to the free end of non-contacting lip 20a. The drip 31 serves to interrupt a water curtain which may flow on the inclined surface of the portion 23, and causes such water to fall on the bottom 26a of chamber 26. Chamber 26 acts as a channel for the gathering and removal of water, whereby water is not allowed to flow over lip 20a and penetrate in chamber 27.

In a still different embodiment shown in FIG. 3, the drip function is remitted to the end portion 33 of outer flange 22. In the variant embodiment of FIG. 3, the outer flange 22 is bent inwards at several locations such that the drip is the edge of truncated cone portion 23.

It is to be understood that the embodiments described above are merely exemplary and that persons skilled in the art may make many modifications without departing from the spirit and scope of the invention. All such modifications and variations are intended to be included within the scope of the invention as defined by the appended claims.

We claim:

1. A sealing device for a rolling bearing having an outer non-rotating race and an inner rotating race, the sealing device comprising:

a first metal annular insert being configured to fasten with the non-rotating race and carrying a rubber gasket sealing member;

second metal annular insert being configured to fasten with the rotating race and having a channel-shaped cross section open in a direction of said gasket sealing member and cooperating therewith so as to provide a labyrinth seal;

the gasket sealing member having an outwardly diverging lip cooperating with said second annular insert to define an annular chamber communicating with the outside of the bearing through a gap of a uniform width which is defined by parallel surfaces of first and second truncated-cone portions diverging towards the outside of the bearing;

the first, truncated-cone portion being integral with said first insert and the second, truncated-cone portion being integral with the second annular insert;

the gap having a length and the width so as to resist water entering said chamber and expel water flowing on said outwardly diverging lip out of said chamber; and wherein said first portion is a part of said rubber gasket sealing member covering the outside of the first annular insert fixed to the non-rotating, outer race of the bearing.

2. A device as claimed in claim 1, wherein the gasket sealing member forms an outer extending lip that covers an opening of said gap, thereby providing a first level of protection.

3. A device as claimed in claim 2, wherein said outer extending lip forms an outer, circumferential water drainage member.

4. A device as claimed in claim 1, wherein the width of said gap is about 0.6 mm.

5. A device as claimed in claim 1, wherein said first metal insert is detachable by means of a fixed junction located at its end portion.

6. A device as claimed in claim 1, wherein said second insert comprises a drip located over said outwardly diverging lip.

7. A sealing device for a rolling bearing having an outer non-rotating race and an inner rotating race, the sealing device comprising:

a first annular insert being configured to fasten with the non-rotating race and carrying a gasket sealing member;

a second annular insert being configured to fasten with the rotating race and having a channel-shaped cross section open in a direction of said gasket sealing member and cooperating therewith so as to provide a seal;

the gasket sealing member having an outwardly diverging lip cooperating with said second annular insert to define an annular chamber communicating with the outside of the bearing through a gap of a uniform width which is defined by parallel surfaces of first and second portions diverging towards the outside of the bearing;

the first portion being integral with said first insert and the second portion being integral with the second annular insert;

the gap having a dimension with a length and the width arranged and configured to resist water entering said chamber and expel water flowing on said outwardly diverging lip out of said chamber; and wherein said first portion is a part of said gasket sealing member covering the outside of the first annular insert fixed to the non-rotating, outer race of the bearing.

8. A device as claimed in claim 7, wherein the gasket sealing member forms an outer extending lip that covers an opening of said gap, thereby providing a first level of protection.

9. A device as claimed in claim 8, wherein said outer extending lip forms an outer, circumferential water drainage member.

10. A device as claimed in claim 7, wherein the width of said gap is about 0.6 mm.

11. A device as claimed in claim 7, wherein said first insert is detachable by means of a fixed junction located at its end portion.

12. A device as claimed in claim 7, wherein said second insert comprises a drip located over said outwardly diverging lip.

* * * * *

UNITED STATES PATENT AND TRADEMARK OFFICE
CERTIFICATE OF CORRECTION

PATENT NO. : 5,890,812

DATED : APRIL 6, 1999

INVENTOR(S) : MARCELLO ET AL.

It is certified that error appears in the above-identified patent and that said Letters Patent is hereby corrected as shown below:

Front page: after "[22] Filed: Jul. 22, 1996" insert a new line and add the following:

-- Foreign Application Priority Data
  Jul. 21, 1995  [IT]                TO95A000625--

Signed and Sealed this

Fourth Day of April, 2000

*Attest:*

Q. TODD DICKINSON

*Attesting Officer*        *Director of Patents and Trademarks*